United States Patent [19]

Hatakeyama

[11] 4,322,757

[45] Mar. 30, 1982

[54] SERVO CONTROL APPARATUS FOR ADJUSTING THE PHASE OF A ROTARY HEAD ASSEMBLY TO CORRECT FOR ERRORS WHICH MAY OCCUR DUE TO CHANGES IN OPERATING CHARACTERISTICS, WHILE MINIMIZING PHASE ERRORS DURING EDIT OPERATIONS

[75] Inventor: Akira Hatakeyama, Atsugi, Japan

[73] Assignee: Sony Corporation, Tokyo, Japan

[21] Appl. No.: 123,722

[22] Filed: Feb. 22, 1980

[30] Foreign Application Priority Data

Feb. 26, 1979 [JP] Japan ............................ 54-21619
Feb. 26, 1979 [JP] Japan ............................ 54-21620

[51] Int. Cl.³ .................................. H04N 5/795
[52] U.S. Cl. ...................................... 360/14; 360/70
[58] Field of Search .................... 360/70, 73, 14; 318/314, 318, 603, 606, 608, 653, 683, 306, 308-310

[56] References Cited

U.S. PATENT DOCUMENTS

| | | |
|---|---|---|
| 3,542,950 | 11/1970 | Luther, Jr. .................... 360/70 |
| 3,654,479 | 4/1972 | Catherin . |
| 3,686,469 | 8/1972 | Clark et al. .................. 360/70 |
| 3,705,840 | 12/1972 | Kosugi ........................ 360/70 |
| 3,742,132 | 6/1973 | Sangun et al. ................ 360/70 |
| 3,778,693 | 12/1973 | Korteling . |
| 3,872,369 | 3/1975 | Rich . |
| 4,003,090 | 1/1977 | Beck ........................... 360/70 |
| 4,047,231 | 9/1977 | Garagnon .................... 360/70 |
| 4,061,950 | 12/1977 | Kayanuma . |
| 4,104,684 | 8/1978 | Wakami et al. ............... 360/70 |
| 4,177,411 | 12/1979 | Takaoka . |
| 4,206,485 | 6/1980 | Sakamoto .................... 360/70 |
| 4,283,671 | 8/1981 | Nakano et al. ............... 318/608 |

*Primary Examiner*—Raymond F. Cardillo, Jr.
*Attorney, Agent, or Firm*—Lewis H. Eslinger; Alvin Sinderbrand

[57] ABSTRACT

A phase servo loop for the head drum of a video tape recorder employs a reference signal to initiate the production of a trapezoidal or ramp signal and a head position signal to sample and hold the values of the trapezoidal signal. The sampled and held value is employed to phase lock the head drum to the reference signal. A variable delay counter applies a variable delay to the head position signal. A flip-flop is used to detect a predetermined phase relationship between the reference signal and the head position signal. The out-put of the flip-flop controls an up-down counter to selectively increase or decrease a number stored therein according to whether or not the above predetermined phase relationship exists. The content or number in the up-down counter is preset into the variable delay counter by the head position signal which is thereafter clocked to its capacity at a high clock rate. The time for the variable delay counter to reach its capacity is thus variable in dependence on the number preset into it. A start-up circuit provides a high clock rate into the up-down counter when the equipment is first turned on to provide rapid phase lock and later reduces the clock rate to minimize jitter. When editing is being performed the number stored in the up-down counter can be held when switching from playback to recording so that no disturbance will occur in the head drum phase control. When playback is resumed, updating of the up-down counter is restarted.

14 Claims, 20 Drawing Figures

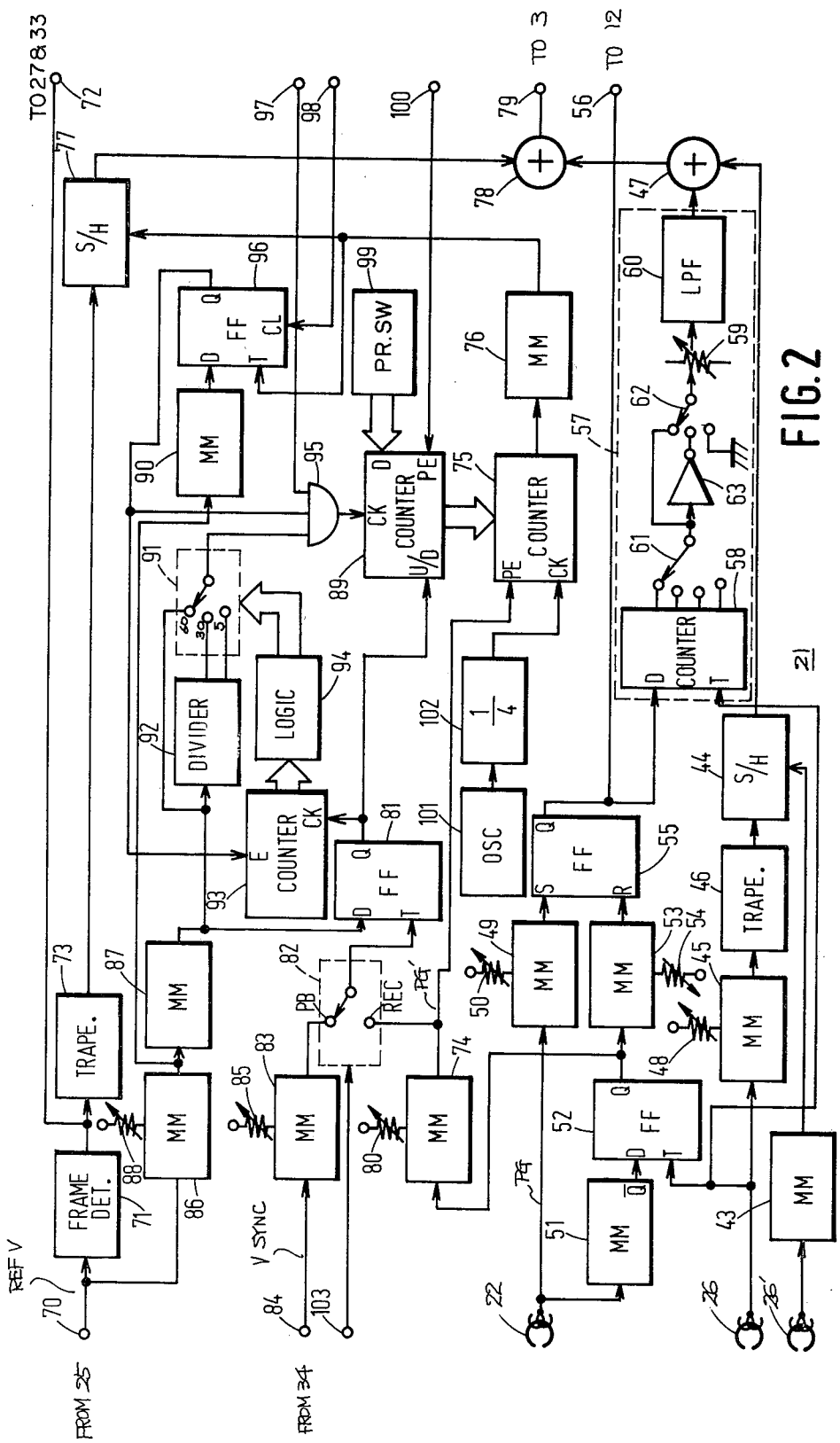

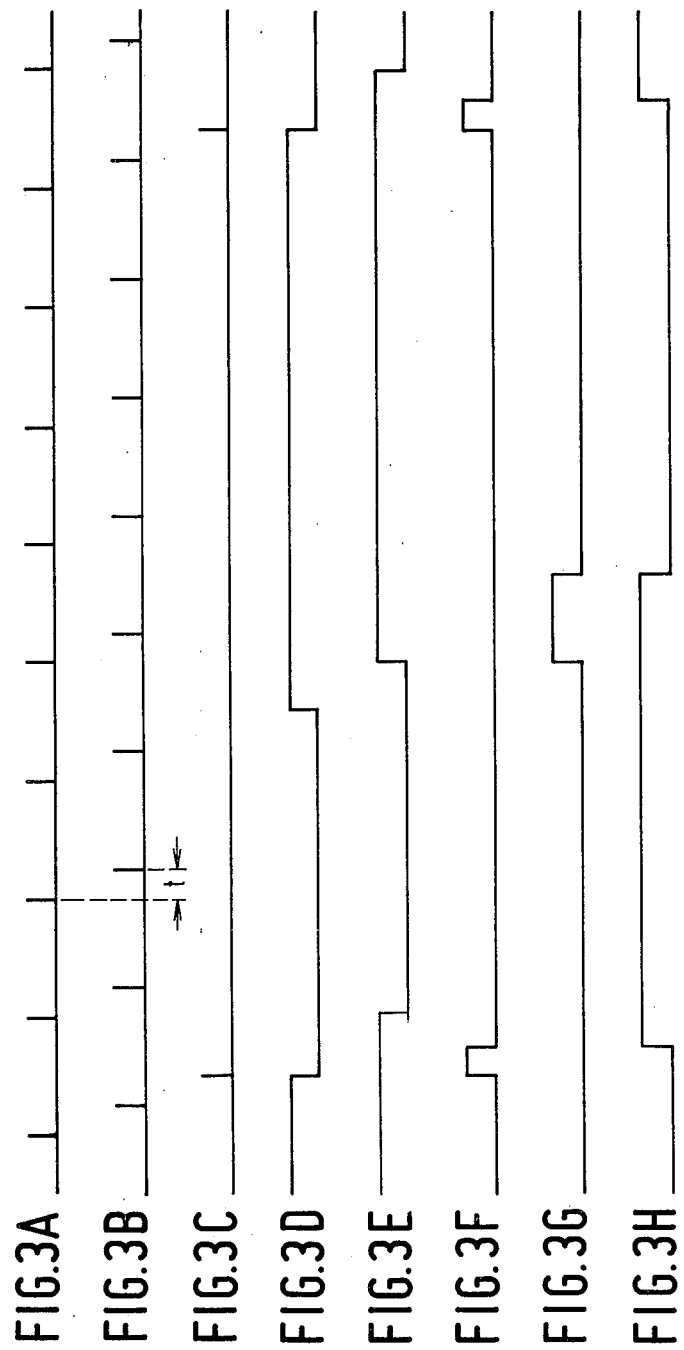

SERVO CONTROL APPARATUS FOR ADJUSTING THE PHASE OF A ROTARY HEAD ASSEMBLY TO CORRECT FOR ERRORS WHICH MAY OCCUR DUE TO CHANGES IN OPERATING CHARACTERISTICS, WHILE MINIMIZING PHASE ERRORS DURING EDIT OPERATIONS

BACKGROUND OF THE INVENTION

This invention relates to a servo control circuit, and more particularly to a head drum servo circuit for a video tape recorder.

Video tape recorders (called hereafter VTRs) include one or more rotary magnetic heads for recording a television signal on a magnetic tape. Although numerous types of VTRs are known differing in the number of rotary magnetic heads and in the manner of wrapping the video tape on the guide drum, they all include a drum servo circuit for controlling the position of their rotary magnetic head or heads and a capstan servo circuit for controlling transport of the video tape past the head drum.

The drum servo circuit establishes and maintains a predetermined rotational phase relationship between the rotary magnetic heads and a reference signal.

One problem with conventional drum servo circuits is that their servo control characteristics change with aging and/or temperature variations. After a head drum motor is used for a long time, for example, more than 1000 hours, its response to a particular error voltage from the drum servo circuit is different from its response when it was new.

An additional problem arises from the fact that there are two principal tape formats called "format A" and "format B" which differ from each other in the location of the point on the tape at which RF switching between magnetic heads takes places. As is well known, such locations of RF switching correspond to reference timing signals for the drum servo circuit. Accordingly, the positions of vertical synchronizing signals recorded on the video tape are slightly different in formats A and B. When a video signal having format A or B is edited onto a video tape which contains a video signal previously recorded by a VTR using the other format, the positions of the vertical synchronizing signals are discontinuous or disordered at the editing cut-in point. When the edited video tape is reproduced, the reproduced image fluctuates at the cut-in point.

OBJECTS AND SUMMARY OF THE INVENTION

It is an object of this invention to provide a drum servo system suitable for use in a video tape recorder and which overcomes the drawbacks of the prior art.

It is another object of this invention to provide a drum servo circuit which controls the rotary phase of the rotary magnetic heads in a video tape recorder.

A drum servo circuit according to this invention includes a conventional phase comparator loop plus an additional comparator loop. The conventional phase comparator loop compares the phase of a head position pulse which is representative of the position of the rotary magnetic heads, with a reference signal which can be obtained, for example, from an external oscillator to produce a control signal for application to the head drum motor. The additional comparator loop compares the phase of the reference signal with the position pulse during recording and with the vertical synchronizing signal during reproducing to produce a variable delay value which is applied in the conventional phase comparator loop to overcome the effect of aging and/or temperature variations in the response of the drum motor to servo error signals.

The invention provides for both insert editing and assemble editing modes in a VTR. In the insert editing mode, the variable delay value is held or stored after a cut-in point at which new video from another source is inserted into a previously recorded video tape. When the VTR is returned to the playback mode after the cutout point, the stored variable delay value may again be changed.

During assemble editing, the variable delay value may be held as in insert editing or, alternatively, continued control of the variable delay value may be permitted as in normal recording. The additional comparator loop responds relatively slowly to a phase error. Thus, there is no tendency for the variable delay to produce a rapid change in head phase which would be discernable in a reproduced picture.

According to an aspect of the invention, there is provided an apparatus for phase control of a rotating element comprising means for rotating the rotating element, means for supplying a reference signal having a first phase, means for generating at least one rotary position signal having a second phase related to a rotary position of the rotating element, means for detecting a first phase difference between the first and second phases, means for controlling the means for rotating in response to the first phase difference in a manner which adjusts the first phase difference toward a predetermined value, means for generating a local signal having a third phase related to rotation of the rotating element, means for detecting a second phase difference between the first and third phases, and further means for controlling the means for rotating in response to the second phase difference in a manner which adjusts the second phase difference toward a second predetermined value.

According to a feature of the invention, there is provided a phase control loop for phase control of magnetic heads of a video tape recorder comprising means for providing a reference signal having a first phase to the phase control loop, means for providing at least one local signal having a second phase related to a phase of the magnetic heads, means for producing a control signal for controlling the phase of the magnetic heads in response to a first difference between the first and second phases, means for providing a second local signal having a third phase related to a phase of the magnetic heads, and means for modifying the control signal in response to a second difference between the first and third phases.

The above, and other objects, features and advantages of the present invention, will become apparent from the following description read in conjunction with the accompanying drawings in which like reference numerals designate the same elements.

BRIEF DESCRIPTION OF THE DRAWINGS

FIG. 2 is a block diagram of a drum servo circuit according to an embodiment of this invention;

FIGS. 3A–3H are waveforms of signals to which reference will be made in describing the operation of the speed servo circuit and the RF switching pulse forming circuits of the drum servo circuit in FIGS. 1 and 2.

DETAILED DESCRIPTION OF THE PREFERRED EMBODIMENT

Figure 1:
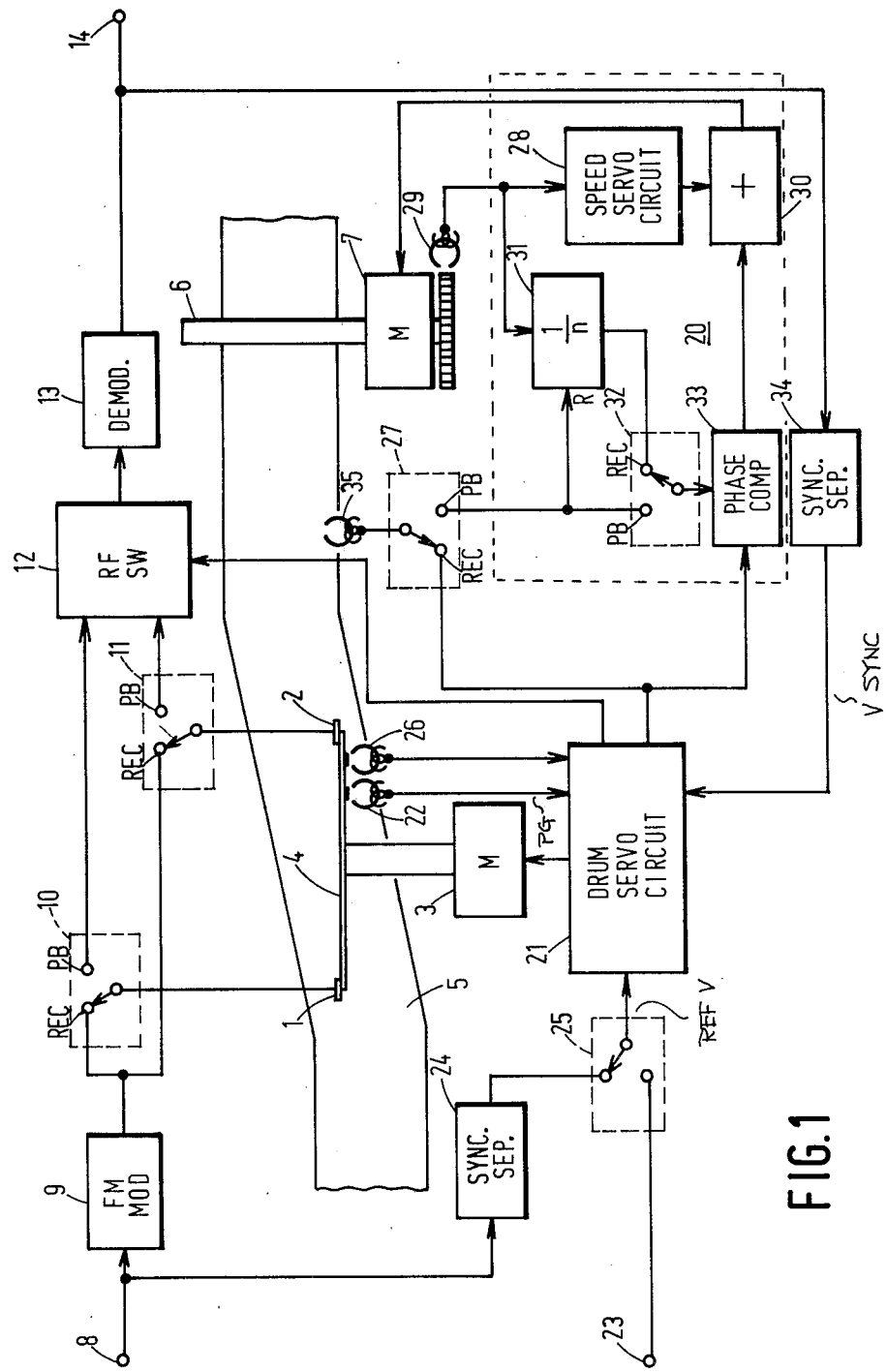
FIG. 1 is a block and schematic diagram of a 180° wrap 2-head helical scan type VTR suitable for use with this invention.

Referring to FIG. 1, a pair of rotary magnetic heads 1 and 2 of a 180° wrap 2-head helical scan VTR are mounted on a rotary disc 4 which is rotated at a speed of 30 rps by a head drum motor 3. A video tape 5 is transported at a predetermined speed between a pinch roller (not shown) and a capstan 6 driven by a capstan motor 7. Rotary magnetic heads 1 and 2 scan video tape 5 which is helically wrapped in a Ω-shape on a drum (not shown) supporting rotary disc 4 to form parallel skewed tracks (not shown) in which video signal information is recorded. Detailed construction of a VTR of this type is well known, thus further description thereof is omitted.

Frequency modulation is generally employed in a VTR. Therefore, a video signal from an input terminal 8 is applied to an FM modulator 9 where it is frequency modulated to produce an FM video signal for application through recording contacts REC of switches 10 and 11 to rotary magnetic heads 1 and 2, respectively.

Conventionally, the video signal of one television field is recorded by a first magnetic head on one track and the video signal of the next television field is recorded by a second magnetic head on the adjacent track. During reproduction, the video signals from rotary magnetic heads 1 and 2 are supplied through reproducing contacts PB of switches 10 and 11 to an RF switching circuit 12. RF switching circuit 12 applies to its output the video signal from the one of magnetic heads 1 and 2 which is scanning video tape 5 to provide a continuous reproduced FM video signal to a demodulator 13. The demodulated video signal from demodulator 13 is applied to an output terminal 14.

An external vertical synchronizing pulse from an input terminal 23 or a vertical synchronizing pulse separated from the input video signal by a synchronizing signal separator 24 is selected for use as a vertical reference signal REF V by a switch circuit 25 for application to a drum servo circuit 21. A phase pulse generator is constituted by a magnetic head 22 stationarily disposed within the influence of a permanent magnet which rotates with rotary disc 4. As the permanent magnet rotates past phase pulse generator magnetic head 22, a head position pulse PG is generated for application to drum servo circuit 21. A single head position pulse PG having a known phase relationship to the rotational positions of magnetic heads 1 and 2 is preferably produced during each revolution or rotary disc 4. The arrival times of the vertical reference REF V and a head position pulse PG are compared in drum servo circuit 21 to produce a drive signal for application to head drum motor 3 for controlling the rotational phase of magnetic heads 1 and 2.

The demodulated video signal at output terminal 14 is also applied to a synchronizing signal separator 34 wherein at least the vertical synchronizing signals are separated therefrom and applied to drum servo circuit 21.

When drum servo motor 3 is a DC motor, drum servo circuit 21 must include a speed servo loop as well as the phase servo loop discussed above. For that purpose, a pair of speed pulse generator magnetic heads 26 and 26' (only head 26 is shown) are fixedly disposed within the influence of a plurality of equally angularly spaced permanent magnets mounted to rotate with rotary disc 4. For example, in a particular practical arrangement, eight permanent magnets spaced from each other by 45° are provided on disc 4 for cooperation with heads 26 and 26'. Speed pulse generator magnetic heads 26 and 26' are angularly displaced from each other to produce spaced pairs of speed pulses as the permanent magnets rotate therepast. The time between the occurrence of the spaced pairs of speed pulses is used to determine the rotational speed of magnetic heads 1 and 2.

Drum servo circuit 21 produces a 30 Hz control pulse signal. In the recording mode, the 30 Hz control pulse signal is supplied through a recording contact REC of a switch 27 to a control track magnetic head 35, which records the control pulse signal on video tape 5. In all modes, the 30 Hz control pulse signal is applied to a phase comparator 33 in a capstan servo circuit 20.

Capstan servo circuit 20 maintains the transport speed of video tape 5 at a predetermined value by controlling the drive signals fed to capstan motor 7. Furthermore, capstan servo circuit 20 maintains the phase of control signals reproduced from video tape 5 in a predetermined relationship with respect to the 30 Hz control pulse signal from drum servo circuit 21. Capstan servo circuit 20, shown within a dashed box, includes a speed servo circuit 28, an adder 30, a frequency divider 31, a switch 32 and phase comparator 33.

Speed servo circuit 28, which may be omitted when capstan motor 7 is an AC motor, receives a speed signal from a conventional capstan speed frequency generator 29. The frequency of the speed signal varies in proportion to the rotational speed of capstan 6. Speed servo circuit 28 produces a DC speed error signal whose amplitude and/or polarity varies in accordance with the departure of the frequency of the speed signal from a predetermined frequency. The speed error is applied to one input of adder 30.

A phase error signal from phase comparator 33 is applied to a second input of adder 30. During recording, the speed signal from capstan speed frequency generator 29 is frequency divided by a factor n to a frequency of 30 Hz in frequency divider 31. The 30 Hz signal from frequency divider 31 is supplied through a recording contact REC of switch 32 to an input of phase comparator 33 where its phase is compared with the phase of the 30 Hz control pulse signal from drum servo circuit 21. Phase comparator 33 produces a DC phase error signal having an amplitude and/or polarity which varies in dependence on the difference in phase of its two inputs. The phase error signal is added to the DC speed error signal in adder 30 to produce a motor control signal for application to capstan motor 7.

During reproduction, both of switches 27 and 32 are placed in their playback positions PB. The control pulse signal recorded along the edge of video tape 5 is reproduced by head 35 and supplied to phase comparator 33 to replace the output from frequency divider 31. Frequency divider 31 is reset by each pulse of the playback control pulse signal applied to its reset input during reproduction. Resetting frequency divider 31 in this way insures that, when switches 27 and 32 are returned to their record contacts REC, the first output from frequency divider 31 will occur 1/30 second later. That is, there is no interruption or timing change in the 30 Hz signal applied through switch 32 to phase comparator 33 as the apparatus is switched over from playback to record. The phase error signal from phase comparator 33 tends to advance or retard the rotational phase of capstan motor 7 and capstan 6 to adjust the transport of video tape 5 such that proper phase correspondence is attained between the control pulse signals and the positions of magnetic heads 1 and 2.

FIG. 2 shows drum servo circuit 21 which contains a speed servo loop, an RF switching pulse forming circuit, a drum rotation error compensator circuit 57, and a phase servo loop. Each of these circuits is discussed in detail in the following paragraphs.

The speed servo loop includes a monostable multivibrator 43, a monostable multivibrator 45 whose duty cycle can be adjusted by a variable resistor 48, a trapezoidal signal generator 46 and a sample-and-hold circuit 44. The speed servo loop produces an analog signal whose amplitude varies according to the rotational speed of magnetic heads 1 and 2.

Speed pulse generator magnetic head 26 feeds a sequence of speed pulses to monostable multivibrator 45. Monostable multivibrator 45 produces a pulse output signal the trailing edge of which initiates the production of a trapezoidal or ramp signal in trapezoidal signal generator 46. The trapezoidal or ramp signal is applied to an input of sample-and-hold circuit 44. Speed pulse generator magnetic head 26' applies a sequence of speed pulses to monostable multivibrator 43. Monostable multivibrator 43 produces a speed sampling pulse in response to each speed pulse input, and such speed sampling pulse is applied to an input of sample-and-hold circuit 44. Upon the arrival of the sampling pulse from monostable multivibrator 43, sample-and-hold circuit 44 produces an analog output signal equal to the value of its trapezoidal or ramp input at the instant of arrival of the sampling pulse and holds this value until the next arriving sampling pulse. The analog output signal from sample-and-hold circuit 44 is applied to an input of an adder 47.

As previously explained, speed pulse generator magnetic head 26 is angularly displaced from speed pulse generator magnetic head 26' to produce speed pulses such as shown in FIGS. 3A and 3B, respectively. The time difference t between each pair of speed pulses from the speed pulse generator magnetic heads 26 and 26' is proportional to the rotational speed of rotary disc 4. The slope or rate of increase of the trapezoidal or ramp output of trapezoidal signal generator 46 is constant. Thus, when the time difference t between arrivals of the signals from speed pulse generator magnetic heads 26 and 26' is long, resulting from a slow rotational speed of rotary disc 4, the trapezoidal output of trapezoidal signal generator 46 is permitted to rise to a relatively high level before being sampled by sample-and-hold circuit 44. A relatively high output signal is then applied to adder 47 to increase the speed of rotary disc 4. Conversely, when the time t between arrivals of the speed pulses from speed pulse generator magnetic heads 26 and 26' is short, indicating high rotational speed of rotary disc 4, the trapezoidal signal from generator 46 is sampled before it has had time to reach a high level and the output of sample-and-hold circuit 44 is relatively low. Thus, the speed error signal applied to adder 47 from sample-and-hold circuit 44 is inversely proportional to the rotational speed of rotary disc 4 whereby the signal applied to drum motor 3 (FIG. 1) tends to hold the rotational speed of rotary disc 4 at a predetermined value. Variable resistor 48 changes the timing of the trailing edge of the pulse from monostable multivibrator 45. Thus, adjustment of variable resistor 48 changes the time at which the trapezoidal or ramp signal is initiated and thus changes the phase of the trapezoidal or ramp signal from trapezoidal signal generator 46 relative to the sampling pulse from monostable multivibrator 43. Variable resistor 48 is adjusted to drive head drum motor 3 at 30 rps.

The RF switching pulse forming circuit includes a monostable multivibrator 49 whose duty cycle can be adjusted by a variable resistor 50, a masking monostable multivibrator 51, a D-type flip-flop 52, a monostable multivibrator 53 whose timing can be adjusted by a variable resistor 54, and a flip-flop 55. Phase pulse generator magnetic head 22 produces a single head position pulse PG (FIG. 3C) each revolution of rotary disc 4. The head position pulse PG is applied to inputs of monostable multivibrator 49 and masking monostable multivibrator 51. An inverted output $\overline{Q}$ of masking monostable multivibrator 51 (FIG. 3D) is applied to the data input D of D-type flip-flop 52. The speed signal (FIG. 3A) from speed pulse generator magnetic head 26 is applied to the trigger input T of D-type flip-flop 52. The direct output Q of D-type flip-flop 52 (FIG. 3E) is applied to an input of monostable multivibrator 53. The outputs of monostable multivibrators 49 (FIG. 3F) and 53 (FIG. 3G) are applied respectively to the set S and reset R inputs of flip-flop 55. The direct output Q of flip-flop 55 (FIG. 3H) is the RF switching pulse which is applied to an output terminal 56 from whence it is connected to an input of RF switching circuit 12 (FIG. 1). Adjustment of the duration of the pulse from monostable multivibrator 49 establishes the timing of the leading edge of the RF switching pulse with respect to the head position pulse PG. Similarly, adjustment of the duration of the pulse from monostable multivibrator 53 establishes the timing of the trailing edge of the RF switching pulse.

The relationships of the speed signal from speed pulse generator magnetic head 26 and the head position pulse PG from phase pulse generator magnetic head 22 are shown on FIGS. 3A and 3C. Upon the arrival of a head position pulse PG, monostable multivibrators 49 and 51 are triggered into their set conditions. The direct output of monostable multivibrator 49 is shown in FIG. 3F. At the conclusion of a fixed duration pulse output of monostable multivibrator 49, flip-flop 55 is triggered into the set condition by the negative-going edge of the pulse from monostable multivibrator 49. The inverted output $\overline{Q}$ of masking monostable multivibrator 51 goes low or "0" (FIG. 3D) when it is triggered by the head position pulse PG. Upon the arrival of the first speed pulse at the trigger input T of D-type flip-flop 52 following the head position pulse, the "0" at the data input D of flip-flop 52 is accepted and the direct output Q of flip-flop 52 assumes the low or "0" condition (FIG. 3E) of the signal at its data input D. Monostable multivibrator 53 is a positive-triggering type and is unaffected by the negative-going signal at its input.

After a delay which is approximately equal to three cycles of the speed signal (FIG. 3A), masking monostable multivibrator 51 times out to thus apply a high or "0" signal to the data input D of D-type flip-flop 52 (FIG. 3D). Upon the occurrence of the next speed pulse (FIG. 3A) following the timing out of masking monostable multivibrator 51, D-type flip-flop 52 is triggered into the set condition (FIG. 3E). The positive going output of D-type flip-flop 52 triggers monostable multivibrator 53 into producing an output pulse (FIG. 3G) for a predetermined time. At the end of the output pulse of monostable multivibrator 53, the negative-going signal applied therefrom to the reset input R of flip-flop 55 resets flip-flop 55 to terminate the positive portion of the RF switching pulse applied to output terminal 14. It will be noted that the negative-going transition of the RF switching pulse (FIG. 3H) is positioned between the two head position pulses PG (FIG. 3C) in relation to the occurrence of a selected one of the speed pulses (FIG. 3A). Thus, the RF switching pulses are triggered into their positive or "1" portions following each head position pulse PG and are triggered into their negative or "0" portions at a fixed time following a particular one of the speed pulses. With proper adjustment of the duty cycles of monostable multivibrators 49 and 53 by variable resistors 50 and 54, respectively, the positive and negative going transitions of the RF switching pulses are accurately timed for controlling RF switching circuit 12 (FIG. 1) in synchronism with the rotation of magnetic heads 1 and 2.

Drum rotation error compensator 57 produces a cyclic compensation signal for overcoming dynamic imbalance in the rotating components. Such dynamic imbalance may arise, for example, from a slight offset mass in rotary disc 4 or head drum motor 3 or from slight bearing misadjustment. Drum rotation error compensator 57 produces a 30 Hz signal whose phase can be positioned in any one of eight positions in the rotation of rotary disc 4 and head drum motor 3. Adjustment of drum rotation error compensator 57 is normally a factory adjustment.

A counter 58 has the RF switching pulse (FIG. 3H) applied to its data input D and the speed signal (FIG. 3A) from speed pulse generator magnetic head 26 applied to its trigger input T. As will be understood from the preceding discussion, eight cycles of the speed signal are applied to counter 58 during one cycle of the RF switching pulse. Counter 58 produces four outputs which are delayed replicas of the RF switching pulse having applied thereto any one of four selectable delays. The difference between adjacent selectable delays is equal to the time between adjacent speed pulses.

A phase selecting switch 61 selects one of the four delayed signals for application to an inverter 63 and to a second phase selecting switch 62. Second phase selecting switch 62 is operative to apply either the selected one of the four outputs of counter 58 to an attenuator 59 or the inverse of the selected output of counter 58. In this way, the signal applied to attenuator 59 can have any one of eight phases with respect to rotary disc 4 and head drum motor 3. Attenuator 59 is adjustable to apply the desired amount of imbalance compensation through a low pass filter 60 to adder 47 where it is added to the speed error signal from sample-and-hold circuit 44. Second phase selecting switch 62 has a third position which grounds the input to attenuator 59 to disable drum rotation error compensator 57.

Figure 4A:
FIGS. 4A-4J are waveforms of signals to which reference will be made in describing the operation of the phase servo circuit and the additional phase servo circuit of the circuit of FIG. 2.
Figure 4B:
Figure 4C:

The remainder of the circuits in FIG. 2 comprise the phase servo loop. In simplest terms, the phase servo loop compares the arrival time of the head position pulse PG with the vertical reference signal REF V (FIG. 4A) and produces an analog signal in response to this comparison which is applied to head drum motor 3 for phase control thereof. A frame detector 71 detects one of the two vertical synchronizing pulses (FIG. 4A) in each television frame, preferably the odd field vertical synchronizing pulse, to produce a framing pulse signal (FIG. 4F) which is applied to an output terminal 72 and to a trapezoidal signal generator 73. The framing pulses at output terminal 72 comprise the 30 Hz control pulse signal which is applied to switch 27 and phase comparator 33 (FIG. 1) as previously explained. Upon receiving a framing pulse, trapezoidal signal generator 73 begins producing a trapezoidal or ramp signal (FIG. 4G) which is applied to an input of a sample-and-hold circuit 77.

Figure 4D:

A signal from D-type flip-flop 52 which, as previously described, has a negative-going edge coincident with the arrival of the first speed pulse from speed pulse generator magnetic head 26 following a head position pulse PG from phase pulse generator magnetic head 22, is applied to a servo phase setting monostable multivibrator 74 which produces a modified head position pulse PG' (FIG. 4D). A variable resistor 80 is provided for adjusting the cycle time of servo phase setting monostable multivibrator 74. The modified head position pulse PG' (FIG. 4D) controls the production of a sampling pulse (FIG. 4I) produced by a monostable multivibrator 76 and applied to sample-and-hold circuit 77 for generating the analog control signal which is applied to an input of an adder 78.

If the modified head position pulse PG' were connected directly from the output of servo phase setting monostable multivibrator 74 to the input of monostable multivibrator 76, a conventional phase servo loop, similar to the speed servo loop previously described, would result. However, in order to overcome aging, thermal and other effects which may tend to interfere with accurate phase servo control, a variable delay counter 75 is interposed between servo phase setting monostable multivibrator 74 and monostable multivibrator 76. Variable delay counter 75 applies a delay to the modified head position pulse PG' according to an additional phase comparison between the vertical reference signal REF V and a local signal which may be alternatively the modified head position pulse PG' or the vertical synchronizing signal V SYNC reproduced from video tape 5 (FIG. 1).

Figure 4E:
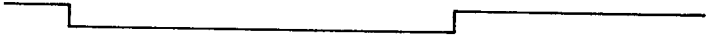
Figure 4F:
Figure 4G:
Figure 4H:

The delay in variable delay counter 75 is controlled according to a number preset into it from a preset counter 89 each time a modified head position pulse PG' is received at the preset input PE of variable delay counter 75. An oscillator 101, preferably a stable crystal oscillator, produces a high-frequency signal, preferably about 3.58 MHz which is divided by four in a divider 102 to produce a clock signal of about 0.9 MHz for application to the clock input CK of variable delay counter 75. Each time variable delay counter 75 is preset with the number from preset counter 89, it is driven by the clock signal at its clock input CK to its capacity at which time it triggers monostable multivibrator 76, then stops until the next modified head position pulse PG' is received at its preset input PE. Thus, the time for variable delay counter 75 to complete its counting function is dependent upon the number preset into it from preset counter 89. An output of variable delay counter 75 is shown in FIG. 4H.

Variable delay counter 75 and preset counter 89 preferably have the same capacity which can be any value sufficient to provide the required range of delay.

The vertical synchronizing signal V SYNC from synchronizing signal separator 34 (FIG. 1) is applied through an input terminal 84 to a monostable multivibrator 83 whose cycle time can be adjusted by a variable resistor 85. An output of monostable multivibrator 83 is applied to a playback terminal PB of an electrically controlled switch 82. The modified head position pulse PG' is applied to a record terminal REC of electrically controlled switch 82. A mode signal applied to an input terminal 103 selects either the playback or the record mode in electrically controlled switch 82. The selected signal in electrically controlled switch 82 provides a local signal for application to the trigger input T of a phase comparison D-type flip-flop 81.

The vertical reference signal REF V at input terminal 70 is applied to an input of a timing adjusting monostable multivibrator 86 whose timing can be adjusted by a variable resistor 88. Timing adjusting monostable multivibrator 86 produces a pulse output (FIG. 4B) in response to each vertical reference signal REF V which is applied to an input of monostable multivibrators 87 and 90. Monostable multivibrator 87 produces a fixed width pulse (FIG. 4C) which is applied to the data input D of phase comparison D-type flip-flop 81 and to an input of a divider 92. In addition, the output of monostable multivibrator 87 is applied to one terminal of a selecting switch 91. The direct output Q of phase comparison D-type flip-flop 81 is applied to the clock input CK of a counter 93 and to the up/down control input U/D of preset counter 89.

A preset switch 99 provides an initial value for preset counter 89 when the equipment is first turned on. The initial value is preferably near the center of the range of preset counter 89. For example, if preset counter 89 and variable delay counter 75 have capacities of 128, the initial value should be about 64. Further, if these counters have capacities of 1024, the initial value should be about 512. The initial value can be established above or below the center as required to initially achieve phase lock in. A preset signal, which may correspond to application of power to the unit, is applied through an input terminal 100 to the preset input PE of preset counter 89 to insert the initial value from preset switch 99 into preset counter 89. After receiving the initial value, the content of preset counter 89 is increased, decreased, or held constant, as will be explained, to control the delay applied by variable delay counter 75.

The contents of counter 93 are decoded in a control logic circuit 94 which, in turn, controls selecting switch 91. Divider 92 divides its 60 Hz input by factors of two and twelve to produce a 30 Hz and a 5 Hz output which are applied to respective terminals of selecting switch 91. The signal selected by selecting switch 91 is applied to one terminal of an AND gate 95.

Monostable multivibrator 90 produces a servo lock window pulse (FIG. 4J) following each pulse of vertical reference signal REF V (FIG. 4A). The servo lock window pulse is applied to the data input D of a servo lock detecting D-type flip-flop 96. The sampling pulse (FIG. 4I) from monostable multivibrator 76 is applied to the trigger input T of D-type flip-flop 96. The direct output Q of D-type flip-flop 96 is applied to a second input of AND gate 95 and to an enable input E of counter 93. A control signal, applied through an input terminal 98 to the clear input CL of D-type flip-flop 96 may be employed during slow, still and fast modes to keep D-type flip-flop 96 in the reset condition and thus prevent the production of a servo lock signal by servo lock detecting D-type flip-flop 96. A control signal may be applied through an input terminal 97 to a third input of AND gate 95 to either enable or inhibit AND gate 95.

The phase servo loop operates as follows. When the equipment is first turned on, a preset signal applied through input terminal 100 to the preset terminal PE of preset counter 89 stores in preset counter 89 the number provided by preset switch 99. Servo lock detecting D-type flip-flop 96 is reset at this time thus providing a "0" from its direct output Q to inputs of AND gate 95 and counter 93. With inputs to its clock input CK cut off by the "0" applied to one of the inputs of AND gate 95, preset counter 89 holds the number preset into it until permitted to change its contents as will be explained. The speed servo loop provides an output signal through adders 47 and 78 and an output terminal 79 which brings the motor and heads speed up to the required value. Each time a head position pulse PG is produced by phase pulse generator magnetic head 22, a modified head position pulse PG' is produced by servo phase setting monostable multivibrator 74 following the next arriving speed pulse from speed pulse generator magnetic head 26. As previously described, the modified head position pulse PG' presets the number stored in preset counter 89 into variable delay counter 75 to control the time of generation of the sampling pulse by monostable multivibrator 76.

Figure 4I:
Figure 4J:

As soon as the phase of the modified head position pulse PG' comes within the lock-in range of the phase servo loop, the sampling pulse applied to the trigger input T of D-type flip-flop 96 (FIG. 4I) falls within the servo lock window pulse (FIG. 4J) applied to the data input D of D-type flip-flop 96. This event sets D-type flip-flop 96 to produce a "1" at its direct output Q which is applied to inputs of AND gate 95 and counter 93. Assuming that a "1" control signal is applied through input terminal 97 to AND gate 95, AND gate 95 begins gating 60 Hz pulses from switch 91 to the clock input Ck of preset counter 89. Depending on the signal applied to the up-down control input U/D of preset counter 89 by D-type flip-flop 81, preset counter 89 begins adding or subtracting one count at a time from its initial preset value at a 60 Hz rate. The next arriving modified head position pulse PG' at the preset input PE of variable delay counter 75 presets the new value from preset counter 89 into variable delay counter 75 thus increasing or decreasing the delay before the production of the sampling pulse by monostable multivibrator 76. If preset counter 89 is controlled to count up, the higher number thereby preset into variable delay counter 75 reduces the delay of variable delay counter 75 before it triggers monostable multivibrator 76 into producing the sampling pulse (FIG. 4I). If preset counter 89 is controlled to count down, the delay before production of the sampling pulse is increased.

If the fixed width pulse (FIG. 4C) from monostable multivibrator 87, related to the arrival time of vertical reference signal REF V, and the local signal (either the modified head position pulse PG' from monostable multivibrator 74 or the pulse derived from the vertical synchronizing signal V SYNC by monostable multivibrator 83) overlap, D-type flip-flop 81 is triggered into the set condition to provide a "1" or high output which is applied to the clock input CK of counter 93 and to the up-down input U/D of preset counter 89. When these two signals do not overlap, D-type flip-flop 81 is triggered into its reset condition to provide a "0" output.

It is the function of D-type flip-flop 81, preset counter 89 and variable delay counter 75 to attempt to maintain the leading edge of the fixed width pulse from monostable multivibrator 87 (FIG. 4C) approximately aligned with the trailing edge of the local signal applied to the trigger input T of flip-flop 81 (FIG. 4D). Referring to the sequence of signals in FIGS. 4C, 4D and 4E, the first pulse of the local signal fed to the trigger input T of D-type flip-flop 81 (FIG. 4D) is too early to overlap the fixed width pulse applied to the data input D thereof (FIG. 4C). Thus, at the negative-going trailing edge of the trigger input T to D-type flip-flop 81, the direct output Q of D-type flip-flop 81 goes low or "0" (FIG. 4E). This places preset counter 89 in the up-counting condition in order to slightly slow down the head drum motor to produce phase coincidence. The second pulses of the signals in FIGS. 4C and 4D, are still out of coincidence, thus the output from D-type flip-flop 81 in FIG. 4E remains low to continue the adjustment of the count in preset counter 89 in the same direction. The leading edge of the third pulse in FIG. 4C just overlaps the trailing edge of the pulse in FIG. 4D. Thus, at the trailing edge of the signal in FIG. 4D, the output of D-type flip-flop 81 changes from low or "0" to high or "1". This reverses the direction in which preset counter 89 counts. In the present instance, preset counter 89 is changed to begin counting down by the "1" at its up-/down control input U/D.

In a short while, the phase of the head drum will be retarded sufficiently to again just move the pulses in FIGS. 4C and 4D out of coincidence. When this condition is detected by D-type flip-flop 81, its output changes to again reverse the direction of counting in preset counter 89. Thus, D-type flip-flop 81 and preset counter 89 continuously operate to adjust the timing of the local signal (the vertical synchronizing signal V SYNC or the head position pulse PG) so that the trailing edge of the trigger input T to D-type flip-flop 81 is just before or just after the leading edge of the data input D to D-type flip-flop 81. Thus, the output of D-type flip-flop 81 oscillates between "0" and "1".

A counter 93, a control logic 94, divider 92 and selecting switch 91 comprise a start-up circuit which enables rapid phase lock after the equipment is turned ON without permitting excessive jitter during normal running. Basically, the start-up circuit updates or increments preset counter 89 at a rapid rate, preferably 60 Hz, just after the equipment is turned ON, then successively reduces the updating rate through an intermediate rate (30 Hz) to a slow update rate (5 Hz). The slow update rate is thereafter maintained for normal running.

When the lock in signal is first received at the enable input E of counter 93, counter 93 is reset to "0". Control logic 94, sensing the "0" in counter 93 places selecting switch 91 in the 60 Hz position as shown in FIG. 2. Thus, preset counter 89 is incremented up or down at a 60 Hz rate by pulses fed from selecting switch 91 through AND gate 95 to the clock input CK of preset counter 89. Each time the output of D-type flip-flop 81 completes a cycle, as previously described, the positive-going signal applied to the clock input CK of counter 93 increments the number in counter 93 by 1 count. After a predetermined number of such cycles have been counted in counter 93, such as three or four cycles, control logic 94 changes the movable contact of selecting switch 91 to its 30 Hz position. This halves the rate at which preset counter 89 is incremented and tends to stabilize phase control of the heads. After an additional predetermined number of cycles of the output of D-type flip-flop 81, for example, an additional four cycles, control logic 94 changes the movable contact of selecting switch 91 into contact with its 5 Hz contact. This is the final running condition of the apparatus and further signals to the clock input CK of counter 93 are ineffective to change the condition of selecting switch 91 as long as the lock in signal remains applied to the enable input E of counter 93 and the control signal applied through input terminal 98 to the clear input CL of D-type flip-flop 96 permits D-type flip-flop to remain in the set condition. For non-standard speed operation, such as, for example, slow, still or fast action, the control signal fed to the clear input CL of D-type flip-flop 96 produces a "0" at the direct output Q thereof which is applied to the enable input E of counter 93. This resets counter 93 to zero When normal speed operation is again enabled by the control signal applied to input terminal 98, the fast, medium and slow start-up sequence is performed as previously described.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for controlling the phase of a rotary head assembly in a signal recording/reproducing system operable in an edit mode to reproduce signals from a record medium until a cut-in point is reached, at which point signals are recorded on said record medium, said apparatus comprising drive motor means for rotatably driving said head assembly to scan at least one head thereon across said record medium to selectively record or reproduce signals thereon; reference means for generating a reference signal of substantially constant frequency and phase; head position sensing means for sensing the rotary position of said head assembly and for generating a position pulse representing said rotary position of said head assembly; phase comparison means for comparing the phases of said reference signal and said position pulse and for controlling the operation of said drive motor means as a function of said phase comparison; means for generating a position signal representing the relative position of said at least one head as it scans across said record medium; detecting means for detecting the phase difference between said reference signal and said position signal during an edit mode prior to reaching said cut-in point; variable delay means for delaying by a variable amount the position pulse whose phase is compared to the phase of said reference signal by said phase comparison means, said variable amount of delay being determined by said detected phase difference; means normally enabling said detecting means to detect the phase difference between said reference signal and said position pulse when signals are recorded on said record medium to determine said variable amount of delay; and means for inhibiting the delay imparted to said position pulse by said variable delay means from changing when said cut-in point is reached during an edit mode such that the delay then exhibited by said variable delay means remains fixed.

2. The apparatus of claim 1 wherein said at least one head reproduces a predetermined synchronizing signal from said record medium as said at least one head scans across said record medium during an edit mode prior to reaching said cut-in point; and wherein said position signal is derived from said reproduced synchronizing signal.

3. The apparatus of claim 2 wherein said signal recording/reproducing system comprises a video signal recording/reproducing system for recording and reproducing video signals in tracks on said record medium, the recorded video signals including a vertical synchronizing signal recorded at a predetermined location in each track; and wherein said reproduced synchronizing signal is said vertical synchronizing signal.

4. The apparatus of claim 3 wherein said variable delay means includes counter means; a source of count pulses for supplying count pulses to said counter means to vary the count thereof, said count establishing the amount of delay imparted to said position pulse; and means for controlling the supply of said count pulses to said counter means as a function of said detected phase difference; and said means for inhibiting comprises means for preventing the count of said counter means from changing.

5. The apparatus of claim 4 wherein said means for preventing comprises gate means normally open to supply said count pulses to said counter means; and means for selectively closing said gate means to prevent said count pulses from being supplied to said counter means.

6. The apparatus of claim 5 wherein said counter means comprises an up/down counter for counting said count pulses in a first direction when said detecting means detects a lagging phase difference and for counting said count pulses in a second direction when said detecting means detects a leading phase difference.

7. The apparatus of claim 6 wherein said means for controlling the supply of said count pulses to said counter means as a function of said detected phase difference comprises means for changing the frequency of the supplied count pulses from a relatively rapid rate when said detecting means initially detects phase differences to progressively slower rates when said detecting means detects further phase differences.

8. Apparatus for controlling the phase of a rotary head assembly in a signal recording/reproducing system, comprising drive motor means for rotatably driving said head assembly to scan at least one head thereon across a record medium to selectively record or reproduce signals thereon; reference means for generating a reference signal of substantially constant frequency and phase; head position sensing means for sensing the rotary position of said head assembly and for generating a position pulse representing said rotary position of said head assembly; phase comparison means for comparing the phases of said reference signal and said position pulse and for controlling the operation of said drive motor means as a function of said phase comparison; means for generating a position signal representing the relative position of said at least one head as it scans across said record medium; selecting means for selecting either said position pulse or said position signal; detecting means for detecting the phase difference between said reference signal and the selected position pulse or position signal; variable delay means for delaying by a variable amount the position pulse whose phase is compared to the phase of said reference signal by said phase comparison means, said variable amount of delay being determined by said detected phase difference; and means for adjusting the rate at which said delay is varied such that said delay is varied at a relatively rapid rate when said detecting means initially detects phase differences, and said delay is varied at progressively slower rates when said detecting means detects further phase differences.

9. The apparatus of claim 8 wherein said means for adjusting the rate at which said delay is varied comprises counter means whose count establishes said delay; means for supplying count pulses to said counter means to determine the count thereof; and a source of said count pulses, said source providing count pulses at a relatively rapid rate in response to initially detected phase differences and providing count pulses at progressively slower rates in response to subsequently detected phase differences.

10. The apparatus of claim 9 wherein said source comprises count pulse generating means; frequency dividing means coupled to said count pulse generating means for dividing the frequency of the generated count pulses by different factors to produce frequency-divided count pulses of respectively different frequencies; selector means for selecting a particular one of said count pulses of respectively different frequencies; and control means for controlling said selector means to select the particular one of said count pulses as a function of the number of phase differences which have been detected.

11. The apparatus of claim 10 wherein said control means comprises a phase difference counter coupled to said detecting means for counting occurrences of said detected phase differences; and logic means coupled to said phase difference counter for decoding the count therein so as to control said selector means to initially select those count pulses having a relatively rapid rate, and then to select those count pulses having progressively slower rates when the count of said phase difference counter reaches predetermined counts.

12. The apparatus of claim 10 wherein said pulse generating means comprises pulse shaping means for shaping said reference signal to said count pulses.

13. The apparatus of claim 8 wherein said position signal is the vertical synchronizing signal included in a video signal reproduced by said at least one head as said at least one head scans across said record medium to reproduce video signals which have been recorded thereon; and said selecting means comprises a changeover switch for selecting said position pulse when said recording/reproducing system is operative to record signals on said record medium and for selecting said vertical synchronizing signal when said recording/reproducing system is operative to reproduce signals from said record medium.

14. The apparatus of claim 13 wherein said recording/reproducing system is operative in an edit mode for reproducing signals from said record medium and then, when a preselected cut-in point is reached, for recording signals on said record medium; and further comprising means for inhibiting any change in the delay imparted to said position pulse when said cut-in point is reached such that the delay then exhibited by said variable delay means remains fixed.

* * * * *